United States Patent [19]

Niemann

[11] 4,439,009
[45] Mar. 27, 1984

[54] BICYCLE LUGGAGE CARRIER AND REFLECTOR STRUCTURE COMBINATION

[75] Inventor: Heinz Niemann, Herford, Fed. Rep. of Germany

[73] Assignee: ESGE-Marby GmbH & Co., KG, Bielefeld, Fed. Rep. of Germany

[21] Appl. No.: 355,683

[22] Filed: Mar. 8, 1982

[30] Foreign Application Priority Data

Mar. 20, 1981 [DE] Fed. Rep. of Germany ... 8108128[U]

[51] Int. Cl.$^3$ .............................................. G02B 5/12
[52] U.S. Cl. ........................................ 350/99; 350/97
[58] Field of Search .................. 224/30 R, 31, 32 A, 224/37–38; 350/97, 99

[56] References Cited

U.S. PATENT DOCUMENTS 3,951,516  4/1976  Rihm ..................................... 350/99
4,117,962  10/1978  Pletscher ............................. 350/97

Primary Examiner—Bruce Y. Arnold
Assistant Examiner—William Propp
Attorney, Agent, or Firm—Frishauf, Holtz, Goodman & Woodward

[57] ABSTRACT

To permit universal attachment of a reflector to any type of luggage carrier, for example having a rectangular frame (1) with bent-down struts (5, 6) extending from longitudinal bars or rods (2, 3) in a transition zone (25, 26), a pair of engagement and holding elements (14) of essentially triangular shape are provided, preferably unitary with a resiliently deforming connecting plate (16) and made of plastic, and having internally projecting clamping elements (15) fitting around the frame parts in the transition zone. For assembly, the resiliently deformable connecting plate is deformed until the clamping elements snap around the rectangular frame, or the support struts respectively, and further resilient deformation is prevented by screwing there against a stiff reflector plate (13) carry carrying the reflector structure as such. The upper surface (125) of the holding elements (14) which fit against the frame in the transition zone may form an extension of the carrier surface. The holding elements can be made to fit the curvature of the transition zone of standard support struts, or may be formed as small projections for universal fit against the support struts or frame elements of any type of carrier for retrofitting such a carrier with a reflector plate.

14 Claims, 9 Drawing Figures

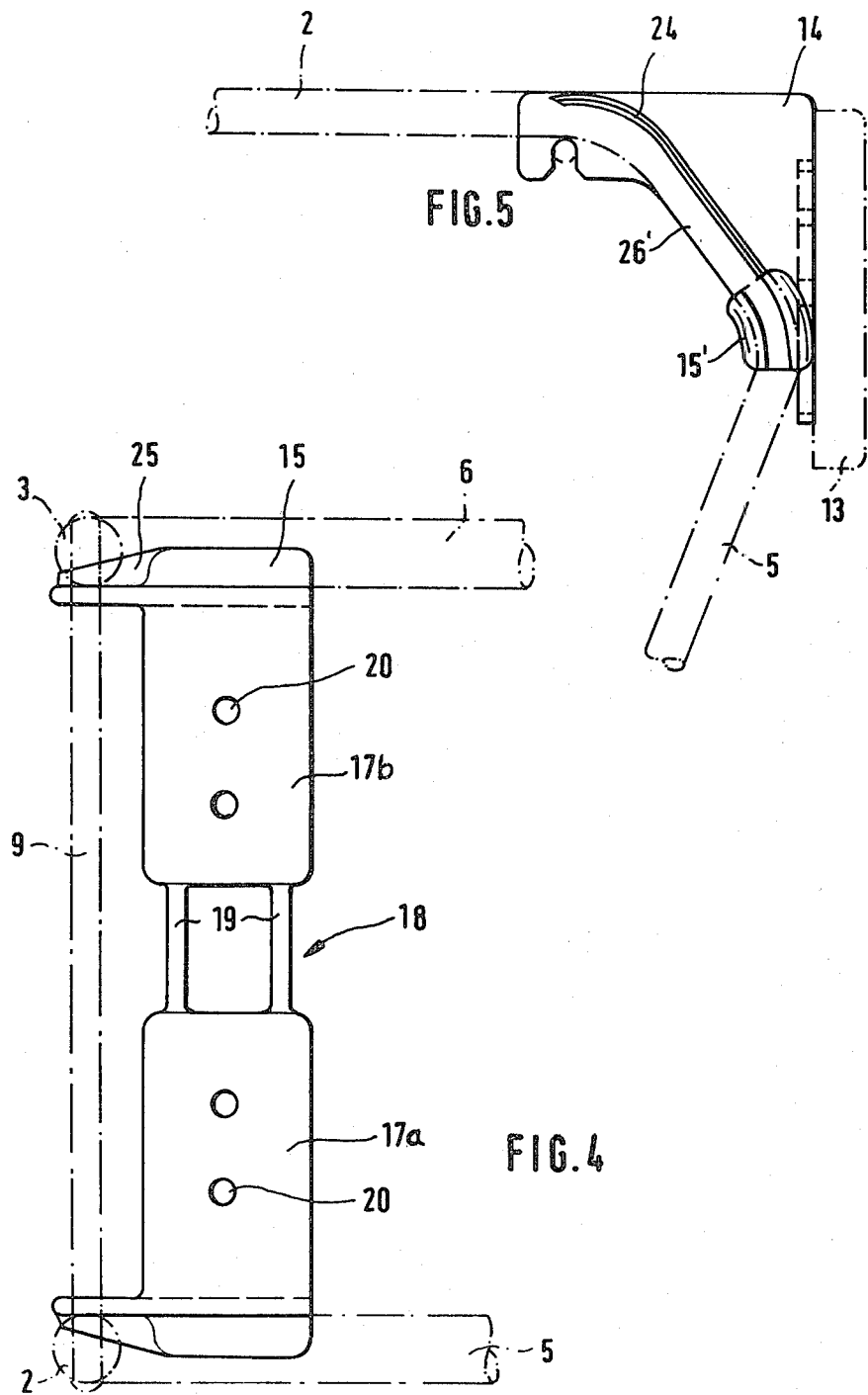

BICYCLE LUGGAGE CARRIER AND REFLECTOR STRUCTURE COMBINATION

This invention relates to a bicycle carrier-reflector structure combination and more particularly to a reflector structure which can be fitted to various types of bicycle carriers, so that the reflector structure, when assembled to the carrier, forms an integral component thereof; the structure is so arranged that it can be applied to newly manufactured carriers as well as to carriers which are alreadly made and installed on bicycles.

BACKGROUND

Various types of bicycle luggage carriers, particularly for use over the rear wheel of the bicycle have a frame which is essentially rectangular. The frame may have an essentially angled-off cross element, which, in cross section, is approximately L-shaped to hold a rear reflector. The reflector support bracket is secured to the cross pieces of the essentially rectangular carrier with screws, or holding clamps. Attaching such a reflector carrier to the bicycle carrier itself causes difficulties, the reflector and reflector holder are subject to unauthorized removal, and the entire structure may result in an even support surface for luggage to be carried on the luggage carrier, which interferes with efficient utilization of the space and purposes thereof (see German Utility Patent DE-GM 72 41 747).

Another type of a luggage carrier for a bicycle utilizes a frame defining the support surface of the carrier which, at its rear end, has a U-shaped element formed as a casting, for example, of plastic, aluminum, or the like. The rear cast element has a depending plate, for example integrally formed therewith, to which a reflector can then be attached. Such a reflector element is limited to use with a luggage carrier having a frame which already includes an attachment plate for the reflector. Unless the luggage carrier is preformed, no reflector can be applied thereto. (see German Utility Patent DE-GM 79 12 107).

THE INVENTION

It is an object to provide a reflector structure which can be associated with already existing, or newly made luggage carriers for two-wheeled cycles—such as bicycles—which is simple, pleasing in appearance and suitable for attachment thereto of various types of reflectors, and particularly of reflectors plates having an extended surface for enhanced safety of the cyclist.

Briefly, a pair of essentially plate-like engagement and holding elements are provided shaped to fit against the facing sides of the longitudinal bars or rods of the frame-like luggage carrier and additionally to fit against the support struts, customarily provided to connect the luggage surface, for support, to the axle region of the bicycle. The engagement and holding elements, thus, fit against the support struts and against the longitudinal bars in the transition zone between the bars and the support struts. Clamping elements are provided formed on each of the engagement and holding elements and shaped to fit at least in part around the facing surfaces of the bars and struts in the transition zone. These clamping elements are snapped in position by resiliently deforming a connecting plate, which, for example, is formed with a resilient transition zone such as a weakened region, a "living hinge" or the like, and, after engaging the elements and within the engagement and holding elements with the existing carrier, the reflector plate is secured against the connecting plate to prevent further deformation thereof and hold it in place, the clamping elements partly surrounding and engaging the structural components of the bicycle carrier.

Assembly of the reflector structure is simple, since the structure can merely be snapped on the longitudinal bars or rods of the luggage carrier and on the support struts thereof, to be held in position by being spread apart by the reflector plate itself. The reflector, thus, is irremovably secured to the luggage carrier. This avoids the necessity of either preforming the luggage carrier to provide an attachment element for the reflector and, on the other hand, drilling holes therein to attach the reflector holder to the luggage carrier, thus weakening the luggage carrier. Preferably, the engagement and holding elements and the resiliently deformed connecting plate are made of deformable plastic, which can be bent or deflected so that the clamping elements can be snapped into position, and then, after having been snapped into position, resilient deformation of the connecting plate is inhibited by attaching the reflector plate thereto.

The attachment plate may, in another form of the invention, be made of stiff parts which are interconnected by a resilient region, such as a "living hinge" or by other elements which permit relative deflection and foreshortening of the distance between the clamping elements or the holding elements upon assembly. In one form, the attachment plate has a central region of lesser thickness; in another form, the attachment plate is formed as two separate elements which are connected by narrow connecting strips or the like which can be deflected upwardly and downwardly, or out of the plane of the connecting plate. If desired, the connecting strips can be preformed to have bowed or bulged shape, for example to be essentially part-circularly bent, so that only little resistance need be overcome when compressing the plate elements of the connecting plate towards each other upon assembly to an existing luggage carrier.

DRAWINGS

FIG. 4 is a rear view of the reflector structure, with the reflector plate itself removed, and showing an existing luggage carrier in broken lines;

FIG. 5 is a side view similar to FIG. 2, showing another embodiment for use with a different type of luggage carrier;

Figure 1:
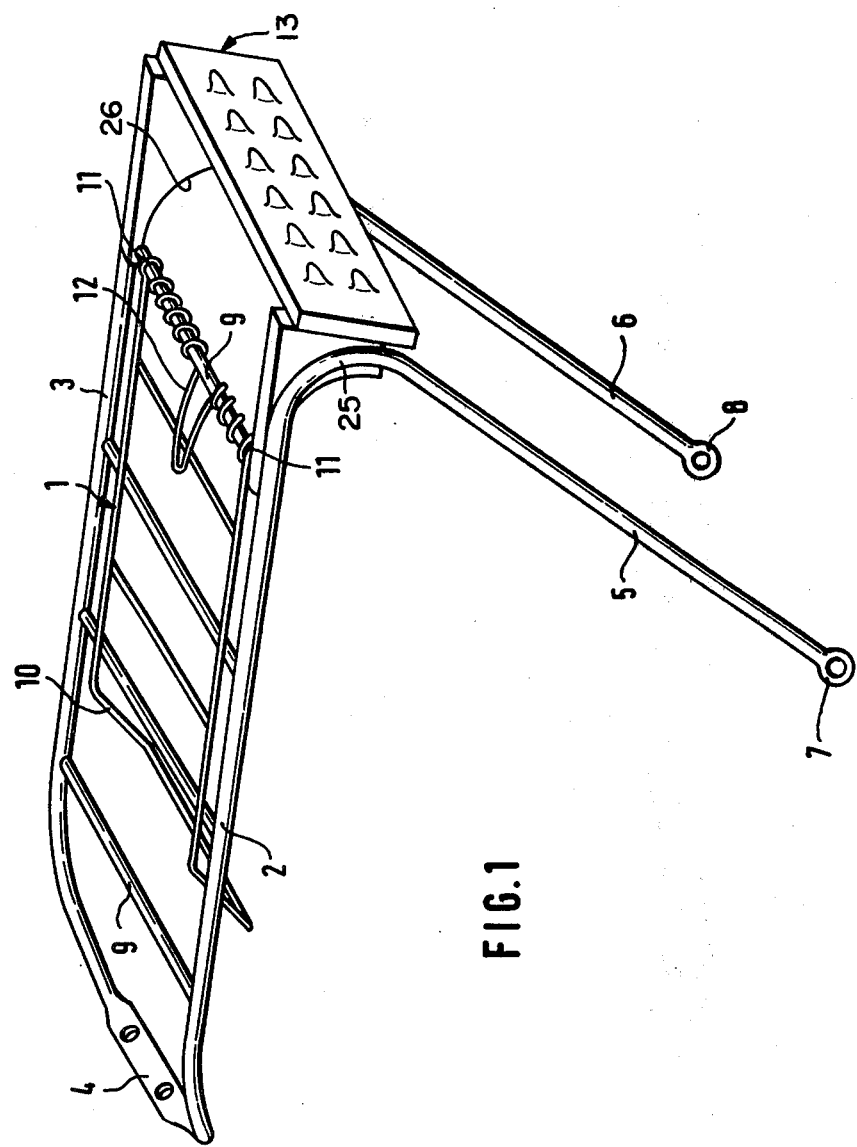
FIG. 1 is a perspective view of a luggage carrier of typical standard construction to which the reflector plate in accordance with the present invention has been assembled.

A rear wheel luggage carrier for a bicycle is shown in FIG. 1; it is made of metal tubing, stiff metal wire or the like, and includes an essentially rectangular frame 1, forming a luggage support surface and constructed of two parallel longitudinal rods or bars 2, 3 which are joined together at one end 4, and flattened to form a plate, for attachment to the rear fork of a bicycle. The other ends of the rods or bars 2, 3 are bent in transition zones 25, 26 to terminate in support struts 5, 6 for attachment to the rear fork of the bicycle, for example adjacent the axle of the rear wheel. Various types of attachment elements and arrangements may be used. The longitudinal rods or bars 2, 3 are cross connected by cross braces 9. The last one or rearward one of the cross braces 9 supports a spring 12 which is wrapped thereabout, to bear against a pivotable bail 10 which is pivotably secured by bent-over loops 11 to the last cross brace 9.

Figure 2:
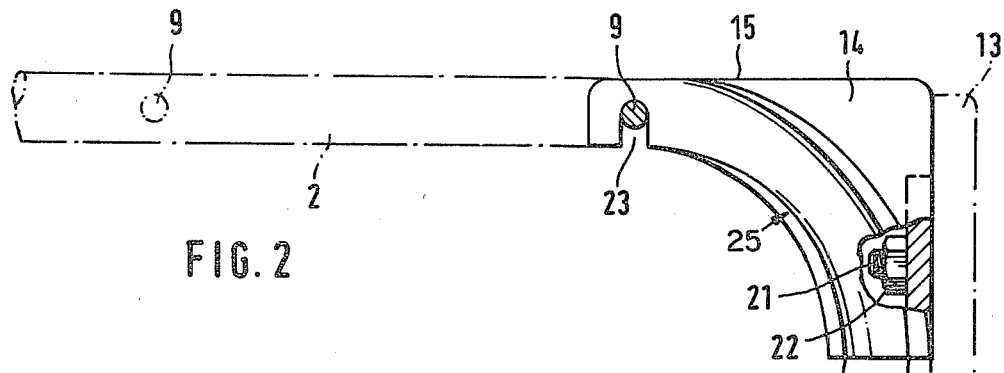
FIG. 2 is a fragmentary side view to an enlarged scale of the rear portion and illustrating attachment of the reflector assembly.
Figure 3:
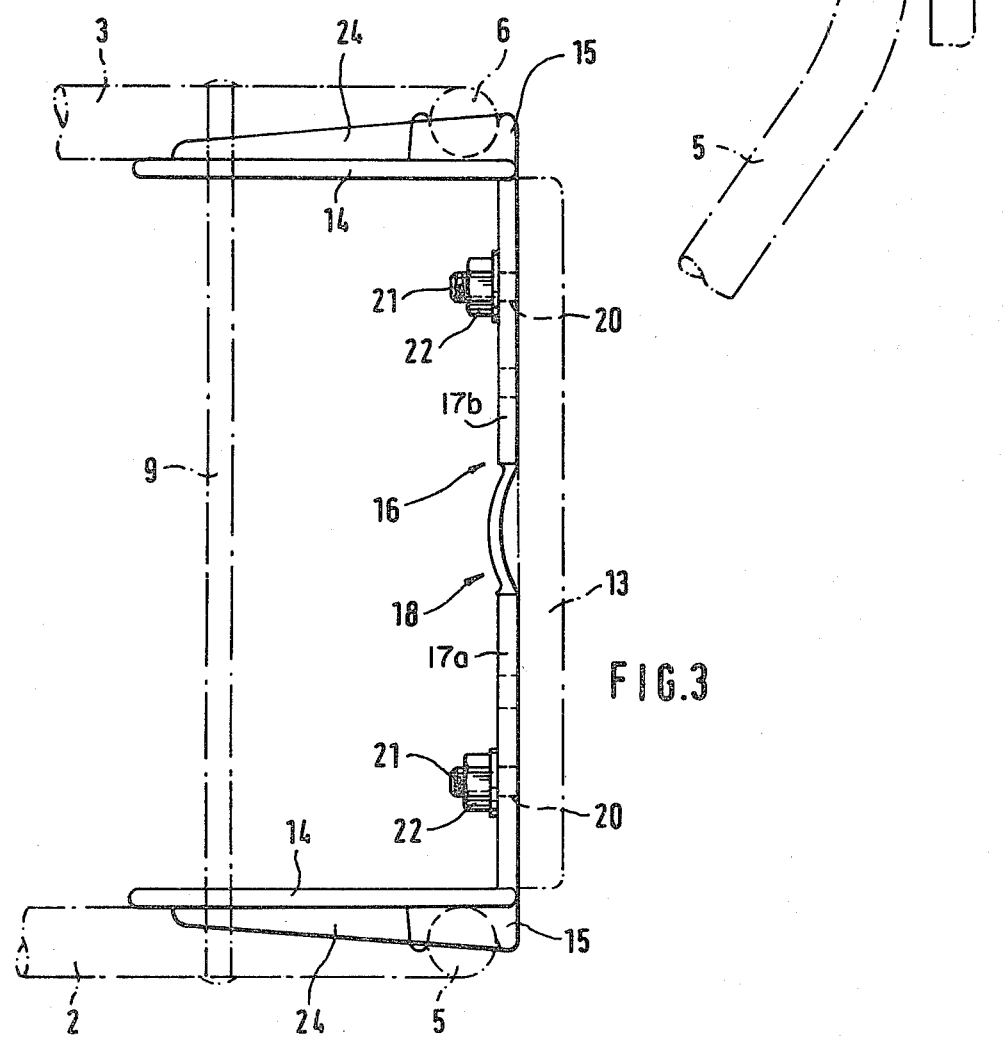
FIG. 3 is a top view of the end portion of the luggage carrier with a reflector structure attached.

In accordance with the invention, a reflector is secured to the rearmost end of the frame 1. The reflector includes a reflector plate 13, for example including highly reflective plastic material, a reflective coating on a plastic strip, a reflective aluminum element or the like. The reflector plate 13 is secured to flat plate-like holder element 14 (FIGS. 2, 3), spaced apart and positioned to fit against the bars or rods 2 and the struts 5, 6 in the transition zones, 25, 26. Each one of the plate-like engagement or holding elements 14 is formed with clamping element 15 (FIG. 3) fitting at least in part around portions of the frame structure 1; as best seen in FIG. 3, the engagement elements 15 fit around the struts 5, 6 around about half the circumference of the struts. The plates 14, with the engagement element 15, are resiliently snapped against the respective portions of the frame 1 so that they are in snug engagement therewith, as best seen in FIG. 3. A connecting plate 16 extends between the plates 14, transversely to the frame, and essentially parallel to the cross connecting rods 9—see FIG. 3. In the embodiment of FIGS. 2-4, the cross connecting plate 16 is formed of two relatively stiff plate portion 17a, 17b, for example integrally molded with the plates 14 and projecting at right angles therefrom. The plate elements 17a, 17b are connected by a flexible region 18. The flexible region 18 is formed of two parallel strips 19 (FIG. 4), spaced from each other and extending parallel with respect with each other. The plates 17a, 17b have holes 20 formed therein, which may include more than one set for each plate, or which may be elongated to accept variable spacing between the plates 17a, 17b. The reflector plate 13, which has bolts 21 molded thereon, is attached through the holes 20 by the bolts 21, secured by nuts 22 (FIG. 3).

The holder is made of plastic which has some flexibility or bending elasticity, and may be made as a single, unitary molding.

Assembly: The reflector element 13 is removed by removing the nuts 22 from the studs 21. The two strips 19 are bent out of the plane of the drawing—with reference to FIG. 4—so that the spacing between the clamping elements 15 is reduced to such an extent that the holding or engagement elements 14 can be inserted between the longitudinal bars or rods 2, 3 in the transition zones 25, 26. The holding elements 14 have hooks 23 to hook over the last cross brace 9—see FIG. 2. The clamping element 15 is fitted against the support struts 5, 6 and the strips 19 are stretched or bent back into the plane of the drawing of FIG. 4. This also fits the engagement or holding elements 14 against the bars or rods 2. The holding elements 14, preferably, are formed with engagement and support projections, or grooves defining projections for snug and tight fit, as seen, for example, at 24 in FIG. 3. After tightly fitting the engagement elements 14 against the bars or rods 2, 3 and the clamping elements 15 against the struts 5, 6, the reflector 13 is secured in position, thus preventing further resilient deformation of the cross connecting plate 16. The resilient zone 18 thereof thus is rendered ineffective.

Preferably, the holding elements 14 (FIG. 2) have an essentially triangular shape. The clamping elements 15 (FIG. 4) extend in the bent portion of the transition zone 25, 26 between the bars or rods 2, 3 and the struts 5, 6; they follow only a portion of the transition zone, and are located at the end of the plate 16 adjacent the reflector 13. The upper surface 125 of the holding element 14 preferably is flat, and extends the luggage support surface of the luggage carrier for longer, or bulkier packages or elements which can be held on the luggage carrier independently of the spring 12 and the connective bail 10.

In the embodiments of FIGS. 4 to 9, the same elements have been given the same reference numerals; similar elements have been given the same reference numerals with prime notation.

Figure 6:
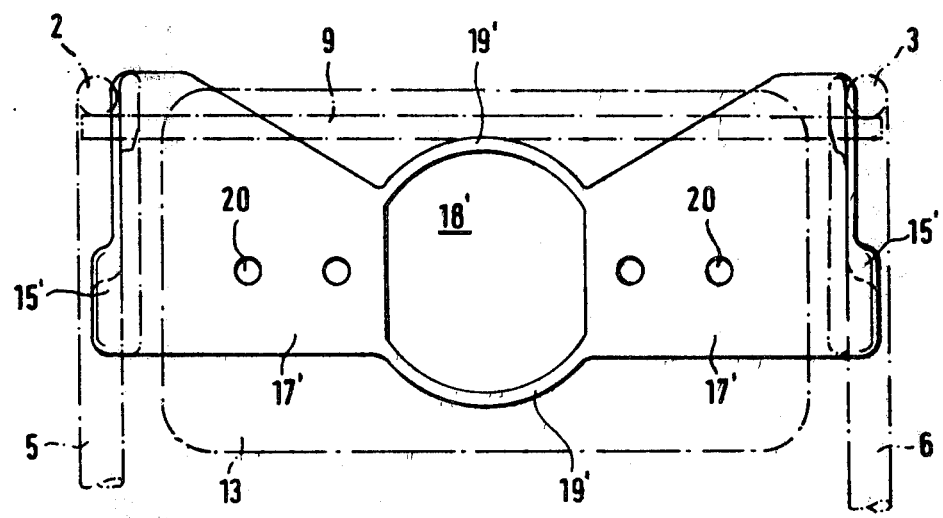
FIG. 6 is an end view of another type of plate, suitable for any one of the embodiments, but illustrating the two-element connecting plate in combination with the structure of FIG. 5.
Figure 7:
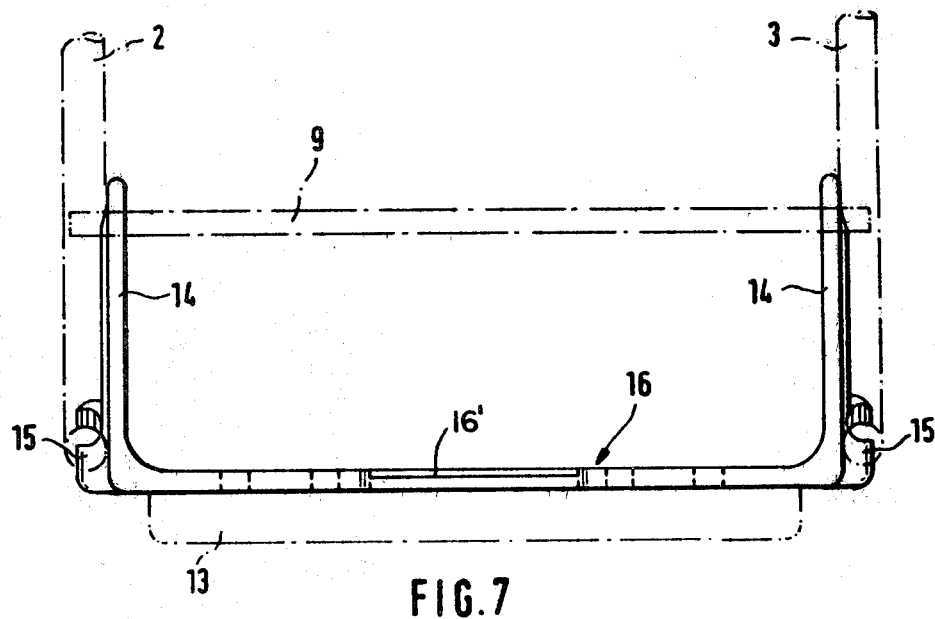
FIG. 7 is a top view of the carrier of FIG. 6.

FIG. 5 illustrates a luggage carrier having a straight transition zone 26' with two sharply bent corners. The reflector structure of the present invention can be used also with such a carrier, as seen in FIGS. 5-7. As clearly seen in FIG. 5, the clamping element 15' is located in the region of the lower bend of the strut 5. It can be identical to that of the clamping element 15, and thus the reflector structure is universally useful.

FIGS. 6 and 7 illustrate a further embodiment of the invention which may be used with that of FIG. 5 or with that of FIGS. 1-4. The two strips 19' of the transition zone 18' connecting plates 17' are bent upwardly and downwardly in essentially part-circular shape. Deformation of the strips 19' thus can be carried out within the plane of the drawing of FIG. 6, and permits easy resilient deformation while maintaining essentially co-plane relationship of the respective plate elements 17'.

In all other respects, the elements of FIGS. 6 and 7 are identical to those of FIGS. 1-5.

Figure 8:
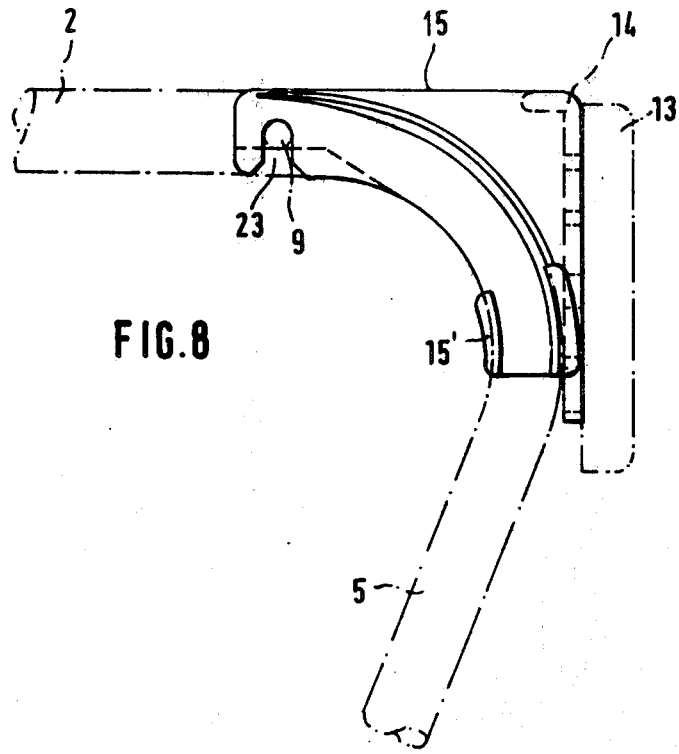
FIG. 8 is a view similar to FIG. 2, illustrating yet another embodiment of the invention.
Figure 9:
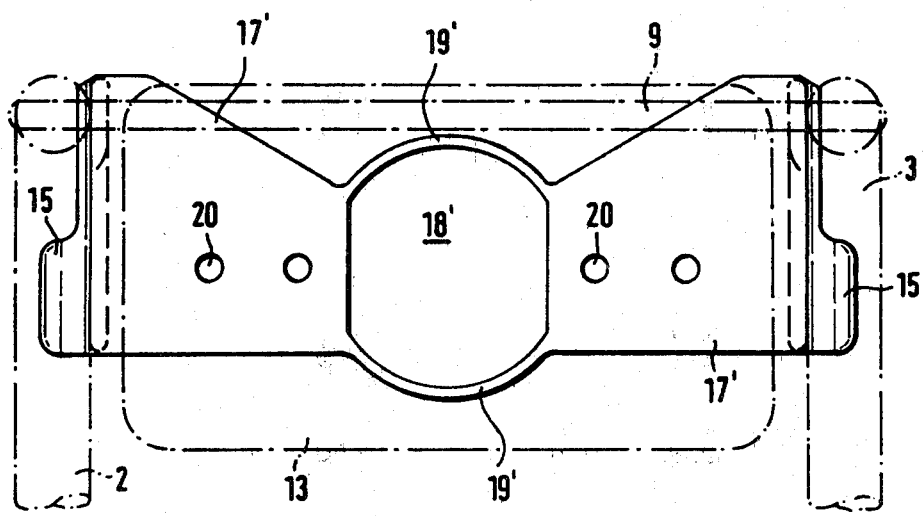
FIG. 9 is an end view, with the reflector plate removed of the structure of FIG. 8.

FIG. 8 illustrates an arrangement similar to FIGS. 2-4 in which plate elements 17' are essentially trapezoidal shaped and connected by a flexible transition zone 18' with essentially circular connecting strips 19' as seen also in FIG. 7.

The flexible zone 18, 18' can be obtained in different manner; rather than using connecting strips 19, 19', the plate 16 can be a unitary element with a weakened or thinner portion 16' transversely thereto, for example centrally located, to form a region similar to a "living hinge." It is, of course, also possible to make the entire element of sufficiently flexible plastic and eliminate a flexible transition zone 18. If this embodiment is selected, the plate 16 is unitary and flexible over its entire length so that it can be deformed out of the plane of the drawing, FIGS. 4, 6 and 9, as explained in connection with the connecting strips 19, FIG. 4 upon assembly to a cycle carrier.

Preferably, the clamping elements 15 are located at the transition zone and are bent to follow the transition zone. This is particularly suitable if the reflector structure is made for a particular type of carrier. For such construction, the clamping elements 15 (FIGS. 2-4) can extend throughout the entire transition zone and follow the transition zone between the bars or rods 2, 3 and the struts 5, 6. This construction also readily permits extending the engagement or holding elements 14 forwardly to form an extension of the support surface. In another form of the invention, and particularly when the reflector structure is to be made to fit universally on various types of carriers, the clamping elements 15 can be constructed as small inwardly projecting stubs, inwardly open, to fit against the struts in the transition zone at a suitable place, for example at the lower bend only. See clamping elements 15', FIG. 8. These clamping elements, of course, also will fit a frame as illustrated in FIG. 5. Extending the engagement and holding elements forwardly to hook over the last cross element 9 results in a particularly sturdy structure of pleasing appearance.

FIG. 7 illustrates the weakened wall zone of the cross connecting plate 16, shown at 16' to permit deflection of the cross connecting plate.

Forming the holding elements 14 in triangular aspect, when viewed from the side (FIG. 2) readily permits extending the luggage carrying surface beyond that afforded by the carriers alone. This region will receive additional stiffness by extending the connecting plate 16 at essentially right angles from holding elements 14. The entire unit—holding elements 14, forward extension to the notch 23, cross connecting plate 16 and clamping elements can be a single unitary plastic molding. The flat plate-like portions formed by the cross connecting plate 16, at least in part, increase the luggage support surface, without interfering, however, with attachment of goods or elements to be carried on the luggage carrier or interfering with holding straps to be applied thereto. The reflector does not interfere with luggage carriers having spring-loaded bails, as shown, since the flat holding portions can readily be located adjacent the pivot eyes 11 of the spring bain.

The clamping elements 15 are preferably located at the ends adjacent the cross connecting plate 16 and may extend over only a minor portion of the bend of the transition zone, so that tolerance differences in the shape of the transition zone will not affect secure attachment, additionally forming the clamping elements only of minor longitudinal extent permits universal application of the reflector structure to various types of luggage carriers. By making the entire unit—holding elements 14, cross connecting plates 16 and clamping element 15—of a single flexible molding, excess regions of the clamping elements can readily be trimmed for field installation to match any existing luggage carrier with a knife.

Various changes and modifications may be made and features described in connection with any one of the embodiments may be used with any of the others, within the scope of the inventive concept.

I claim:

1. For combination with a cycle luggage carrier, having a rectangular frame (1) including two longitudinal bars or rods (2, 3), cross connecting elements (9) cross connecting said longitudinal bars or rods, and support struts (5, 6) bent off from said bars or rods and forming a transition zone (25, 26) therewith, said support struts extending to the region of the wheel axle of the cycle for attachment to the frame of the cycle,
   a reflector structure having
   a reflector plate (13) and means for attachment of the reflector plate to the frame,
   comprising, in accordance with the invention,
   a pair of essentially plate-like engagement and holding elements (14) shaped to fit against the facing sides of the longitudinal bars or rods (2, 3) of the frame (1) and support struts (5, 6) in the region of the transition zone (25, 26) between the longitudinal bars or rods and the support struts;
   a clamping element (15) formed on each of the engagement and holding elements (14) shaped to fit at least in part around the facing surfaces of the frame in the transition zone (25, 26);
   a resiliently deformable connecting plate (16, 17a, 17b, 17', 18, 18', 19, 19') cross connecting said engagement and holding elements to permit resilient deformation thereof upon assembly to the frame of the carrier;
   and wherein the reflector plate (13) is a stiff plate-like element fitting against at least a major portion of the connecting plate and includes attachment means (21, 22) for securing the reflector plate (13) against at least a major portion of the connecting plate and stiffening the connecting plate, upon attachment thereto, for preventing resilient deformation thereof after assembly of the engagement and holding element (14) with the clamping elements (15) thereon to the frame (1) of the carrier.

2. Reflector structure according to claim 1, wherein the connecting plate is a single unitary element made of inflexible plastic.

3. Reflector structure according to claim 1, wherein the connecting plate (16) comprises two stiff plate elements (17a, 17b; 17') molded on and unitary with said holding elements (14);
   and a flexible zone (18, 18') connecting said stiff plate element.

4. Reflector structure according to claim 3, wherein said flexible zone is formed by a region of reduced wall thickness (16').

5. Reflector structure according to claim 3, wherein said flexible zone (18, 18') is formed by strip elements (19, 19') which are resiliently deformable and unitary with said plate elements (17a, 17b, 17').

6. Reflector structure according to claim 5, wherein said strip elements (19) extend directly across the structure in the plane of said plate elements (17) and are resiliently deflectable out of said plane.

7. Reflector structure according to claim 5, wherein said strip elements extend essentially in the plane of said plate elements (17a, 17b, 17') and are bulged or bent in at least approximately part-circular shape within said plane for deformation within said plane.

8. Reflector structure according to claim 1, wherein said clamping elements are bent and shaped to fit the transition zone (25, 26) of the carrier.

9. Reflector structure according to claim 1, wherein said engagement and holding elements (14) are formed with a projecting portion fitting over the last one of the cross connecting elements (9) of the carrier (1).

10. Reflector structure according to claim 9, further including a hook portion or groove (23) formed in the extending portion to fit over said last cross connecting element (9).

11. Reflector structure according to claim 9, wherein said engagement and holding elements (14) in side view are approximately triangular and have an upper surface (125) which forms an extension of the upper surface of the rectangular frame (1) of the carrier, and extends at least at an approximately right angle with respect to said connecting plate (16).

12. Reflector structure according to claim 11, wherein said engagement and holding elements, said clamping elements and said resiliently deformable connecting plate comprise a unitary plastic molding.

13. Reflector structure according to claim 11, wherein said clamping elements (15) are located on the engagement and holding elements (14) adjacent the connecting plate (16), and extend over only a minor portion of the transition zone (25, 26) of the luggage carrier.

14. Reflector structure according to claim 1, further including support and engagement means (24) formed on said engagement and holding elements for engaging at least one of: the support bars or rods (2, 3); the struts (5, 6) and the transition zone (25, 26)
of the cycle carrier to provide additional support and fitting surfaces between the reflector structure and the cycle carrier.

* * * * *